United States Patent
Johnston et al.

(10) Patent No.: US 7,792,280 B2
(45) Date of Patent: Sep. 7, 2010

(54) NARROW BAND TONE DETECTION IN ECHO CANCELING SYSTEM

(75) Inventors: Renee Johnston, Dunrobin (CA); Mirjana Popovic, Ottawa (CA); Dieter Schulz, Dunrobin (CA); Jan Radecki, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1625 days.

(21) Appl. No.: 11/045,825

(22) Filed: Jan. 27, 2005

(65) Prior Publication Data
US 2005/0169458 A1    Aug. 4, 2005

(30) Foreign Application Priority Data
Jan. 30, 2004    (GB)    ................... 0402096.2

(51) Int. Cl.
H04M 9/08    (2006.01)
(52) U.S. Cl. ................................. 379/406.04
(58) Field of Classification Search ............. 379/406.04
See application file for complete search history.

(56) References Cited

U.S. PATENT DOCUMENTS

| 4,363,100 A | 12/1982 | Agnew et al. |
|---|---|---|
| 4,669,114 A | 5/1987 | Reesor et al. |
| 5,592,548 A * | 1/1997 | Sih ........................ 379/406.08 |
| 5,689,556 A | 11/1997 | Gupta et al. |
| 2003/0016815 A1 | 1/2003 | Kurtz et al. |
| 2003/0235244 A1 | 12/2003 | Pessoa et al. |
| 2003/0235312 A1 | 12/2003 | Pessoa et al. |
| 2004/0001450 A1 * | 1/2004 | He et al. ..................... 370/286 |

* cited by examiner

*Primary Examiner*—Alexander Jamal

(57) ABSTRACT

The present invention relates generally to tone detection in echo canceling systems, and more particularly to a method of monitoring oscillations of adaptive filter coefficients for narrow band tone detection in echo cancellation systems. The invention is directed at improving communication in a telephone communication network having one or more hybrid connections. A method for detecting continuous tones in an echo canceling system having an adaptive filter is provided. Continuous tones have a deleterious effect on the performance of adaptive filters. In the present invention, the adaptive filter coefficients are monitored. Oscillation of those coefficients indicates continuous tone presence.

4 Claims, 4 Drawing Sheets though U.S. Pat. No. 4,363,100 addresses tone detection which could be used in an echo cancelling system, it does not use the infrastructure of echo cancelling system to detect the tones.

NARROW BAND TONE DETECTION IN ECHO CANCELING SYSTEM

FIELD OF THE INVENTION

The present invention relates generally to tone detection in echo canceling systems, and more particularly to a method of monitoring oscillations of adaptive filter coefficients for narrow band tone detection in echo cancellation systems.

BACKGROUND OF THE INVENTION

The signal path between two telephones, involving a call other than a local one, requires amplification using a four-wire circuit. The-cost and cabling required discourages extending a four-wire circuit to a subscriber's premise from the local exchange. For this reason, the four-wire trunk circuits are coupled to two-wire local circuits, using a device called a hybrid.

Hybrid echo, the primary source of echo generated from the public-switched telephone network (PSTN) is created as voice signals are transmitted across the network via the hybrid connection at the two-wire/four-wire PSTN conversion points.

Unfortunately, the hybrid is by nature a leaky device. As voice signals pass from the four-wire to the two-wire portion of the network, the energy in the four-wire section is reflected back, creating an echo of the speech signal. Provided that the total round-trip delay occurs within just a few milliseconds, the echo generates a sense that the call is live by adding sidetone, thereby making a positive contribution to the quality of the call.

In cases where the total network delay exceeds 36 ms, however, the positive benefits disappear, and intrusive echo results. The actual amount of signal that is reflected back depends on how well the balance circuit of the hybrid matches the two-wire line. In the vast majority of cases, the match is poor, resulting in a considerable level of signal being reflected back.

The effective removal of hybrid echo is one key to maintaining and improving perceived voice quality on a call. This has led to intensive research into the area of echo cancellation, with the aim of providing solutions that can reduce echo from hybrid. By employing this technology, the overall speech quality is improved significantly.

It is known in the art to employ adaptive filtering to address hybrid echo cancellation. In an adaptive filter, the filter coefficients are based, in part, on feedback of filter output. Normalized Least Mean Square (NLMS) adaptive filtering is one method, popular in echo cancellation, to address reflections in the telephony system.

Where an excitation is highly correlated, e.g. a continuous tone, the NLMS algorithm performs poorly. Where NLMS adaptive filtering is employed, tone signals, such as those employed in telephony tone dialing systems, may have a detrimental effect on other components, such as noise level calculators, Echo Return Loss (ERL) calculator, and Echo Return Loss Enhancement (ERLE) calculator, etc.

U.S. Pat. No. 4,363,100 discloses a tone detector in the form of a digital correlator, in which PCM signal samples are delayed in a RAM for the correlation period. Although U.S. Pat. No. 4,363,100 addresses tone detection which could be used in an echo cancelling system, it does not use the infrastructure of echo cancelling system to detect the tones.

U.S. Pat. No. 4,669,114 discloses a digital progress tone detector, for connection to a telephone line and a PABX. Again, this disclosure could be used in an echo cancelling system but it does not use the infrastructure of echo cancelling system to detect the tones.

What is needed is a method of detecting tones in a NLMS adaptive filter echo canceling system, and alerting this system to the presence of such tones.

SUMMARY OF THE INVENTION

It is an object of an aspect of this invention to detect tones in an echo canceling system.

In an aspect of the invention, there is provided a method for using the adaptive filter of an echo canceling system for detecting tones. In this method, a determination is made as to whether coefficients of the adaptive filter oscillate or do not oscillate. If the coefficients oscillate, the echo canceling system is notified that a tone is present.

BRIEF DESCRIPTION OF THE DRAWINGS

An embodiment of the present invention will now be described, by way of example only, with reference to the attached Figures, wherein.

DETAILED DESCRIPTION OF THE INVENTION

Figure 1:
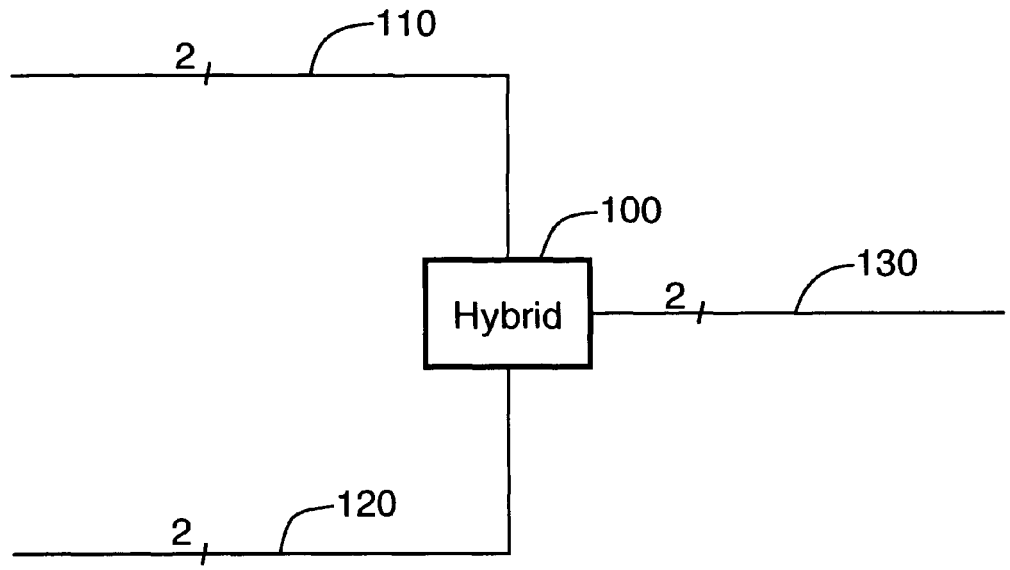
FIG. 1 is a schematic representation a telephony hybrid according to the prior art.

Referring to FIG. 1, there is shown a typical hybrid 100 for connecting a four-wire line, consisting of independent transmit and receive wire pairs, 110 and 120, respectively, to a single two-wire shared transmit/receive line 130. A person familiar with telephony will understand that the hybrid 100 is a source of echo. Multiple hybrids may connect the lines used for a given call.

Echo Return Loss (ERL) is a measure of the actual amount of signal reflected back. The higher the ERL, the lower the reflected signal back to the talker, and vice versa.

Figure 2:
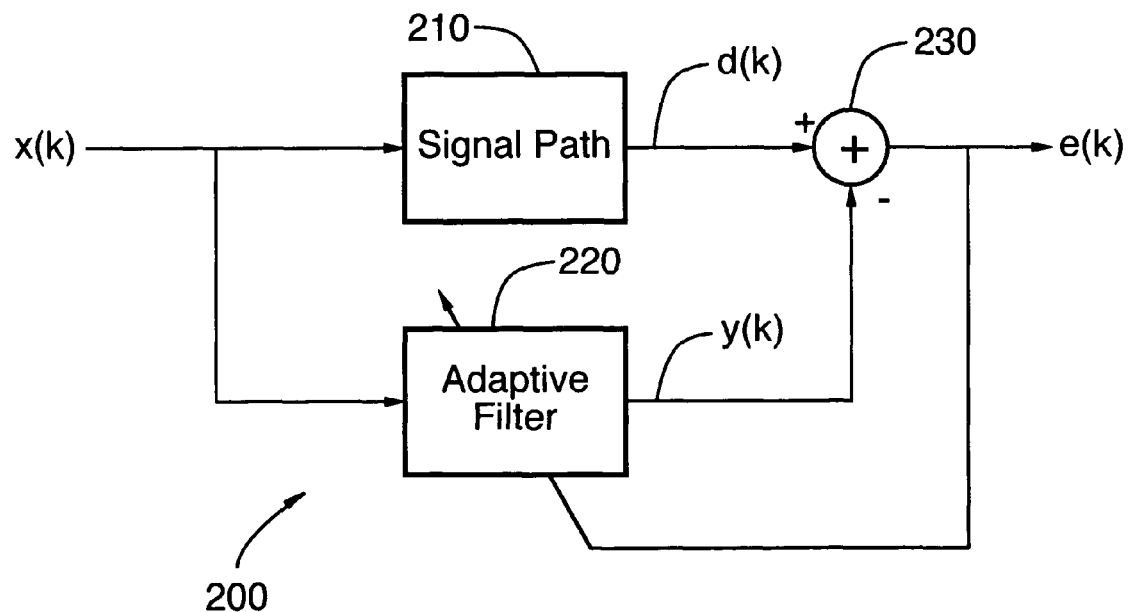
FIG. 2 is a control block diagram of an adaptive filter echo canceling system according to the prior art.

Referring to FIG. 2, there is shown a typical adaptive filter echo cancellation system 200. Un-adapted signal path 210 and adaptive filter 220 share a common input, and are output to a subtractor 230, which is in turn fed back via the filter 220 coefficients.

For each discrete time k, signal x(k) is input to un-adapted signal path 210 and adaptive filter 220. The path 210 outputs the signal d(k) which is a combination of the echo from original signal x(k), noise, and near end speech. The adaptive filter 220 output is y(k) for each discrete time k. The subtractor 230 generates an error e(k) as follows:

$$e(k)=d(k)-y(k). \quad (1)$$

The adaptive filter output y(k) is based on a number, N, of previous inputs x(k) according to the formula $$y(n) = \sum_{i=0}^{N-1} (w_i) * x(n-i) \quad (2)$$

wherein $w_i$ is the coefficient relating to the (i)th input previous to the current input x(n). Normalised least mean square (NMLS) algorithm is one method of determining coefficients $w_i$. The NLMS coefficient formula is $$w_{n+1} = w_n + \mu * x(n) * e(n) * (\delta + *|x(n)|^2)^{-1} \quad (3)$$

wherein μ is a NLMS step size, and δ is an arbitrarily small constant added to prevent division by zero. As an alternative to the inclusion of small constant δ, coefficient adaptation may be restricted to cases where energy is above a minimum level. The step size determines the rate of convergence, which is required for adaptive filtering. However, although a larger step causes faster convergence, large step size also results in greater adaptation error after convergence. For the NLMS algorithm, if μ is greater than 2, instability of output may result from divergence of the coefficients.

There is a drawback to employing adaptive filtering in telephony echo canceling systems. Highly correlated inputs, such as the continuous tones generated in Dual Tone Multi-frequency (DTMF) tone dialing subsystems, can have a negative effect. In the presence of highly correlated signals, the NLMS adaptive filter does not reflect the transfer function of the hybrid; the reflection position cannot be exactly located.

Figure 3:
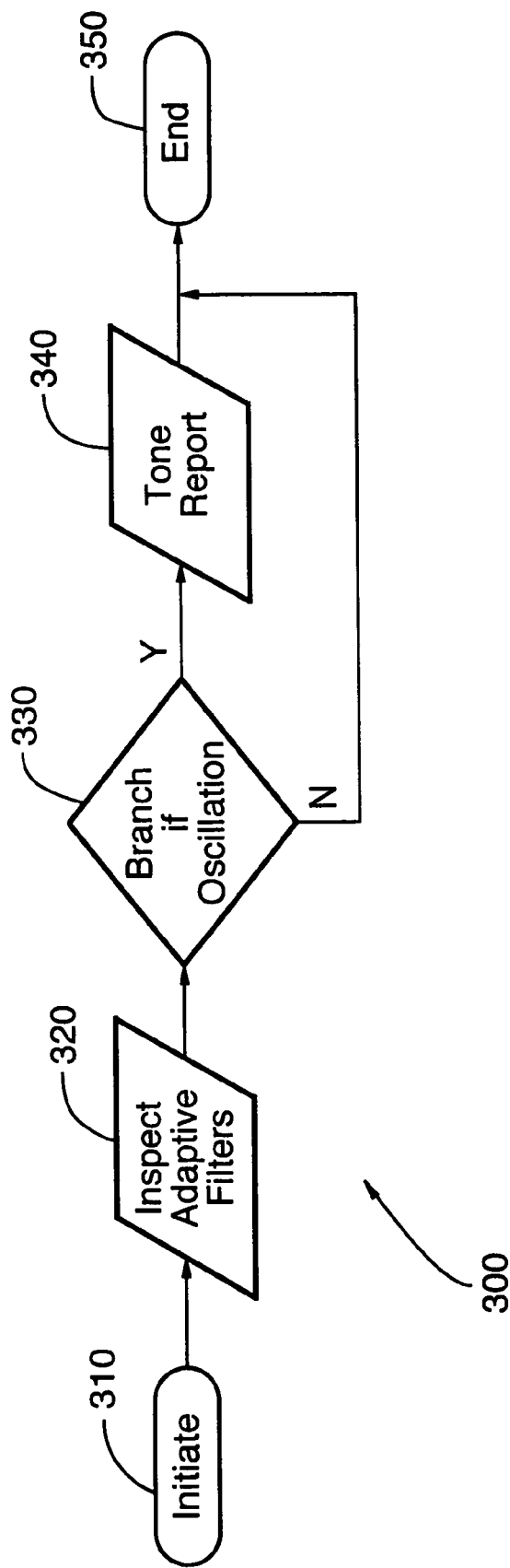
FIG. 3 is a flowchart of a method of detecting tones in operation of an echo canceller, according to the present invention.

Referring to FIG. 3, there is shown a flowchart of a method 300 according to one embodiment of the invention. The first step of this method, after initiation 310, is inspection 320 of the adaptive filter coefficients. Subsequently, a conditional branch 330 is made on the basis of coefficient oscillation. If a determination is made that the coefficients of the adaptive filter oscillate then tone reporting 340 and termination 350 occur. If a determination is made that the coefficients of the adaptive filter do not oscillate, termination 350 occurs. Convolution of a narrow band signal x(t) with any transfer functions h(t) will result in a narrow band signal y(t).

$$y(t) = x(t) \otimes h(t)$$

Figure 4:
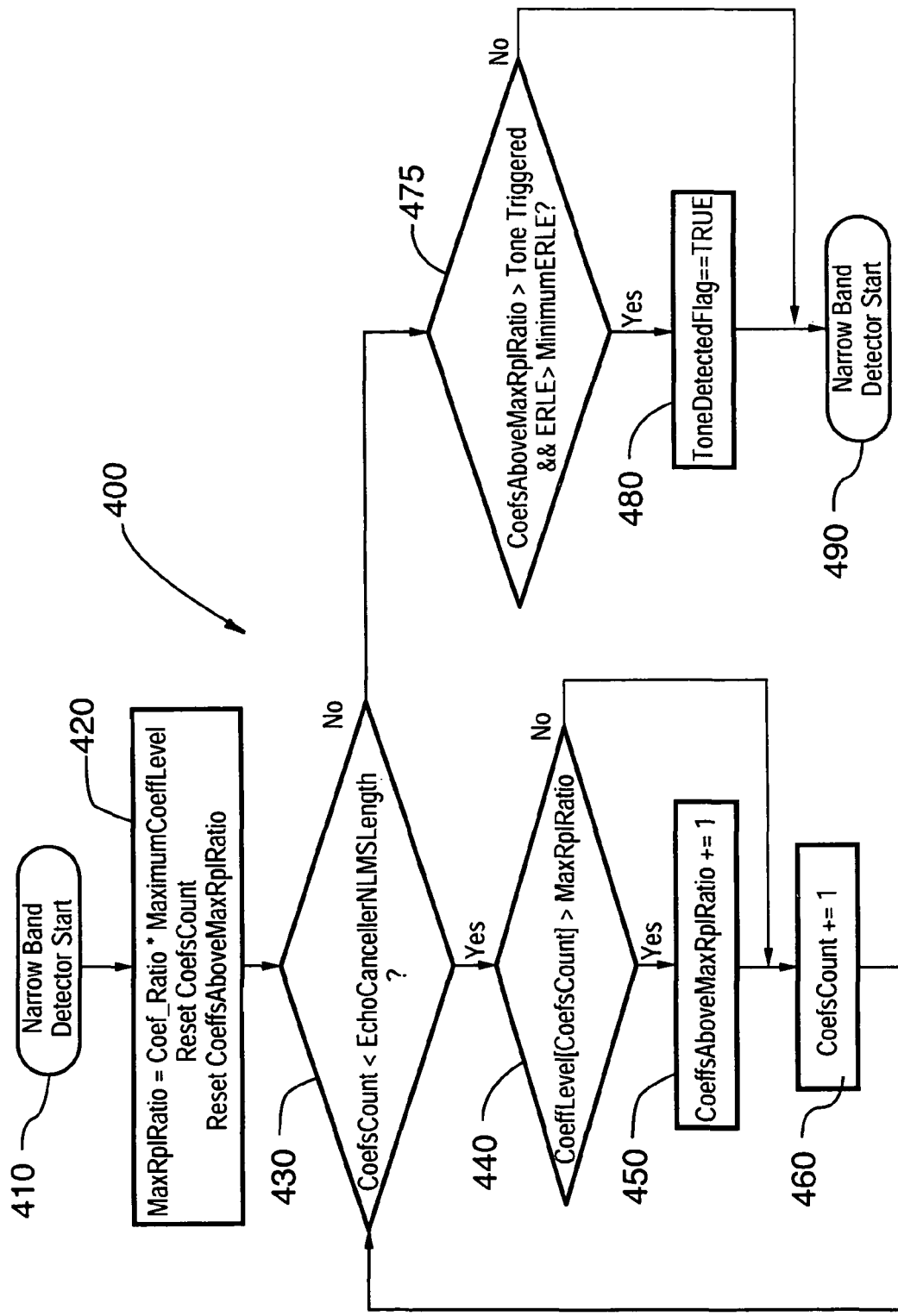
FIG. 4 is a flowchart showing further details of the inventive method according to FIG. 3.

Referring to FIG. 4, there is shown a flowchart of a preferred method for the implementation of the conditional branch 330. After initiation 410, a threshold (MaxRplRatio) is set (step 420), an exceed counter (CoefsAboveMaxRplRatio) and a coefficients counter (CoefsCount) are reset. In the preferred embodiment, the oscillation threshold (MaxRplRatio) is selected by multiplying the maximum of the coefficient absolute values (MaximumCoeffLevel) with a constant (Coef_Ratio typically set to 0.07). The next step is a conditional branch 430, for determining if all coefficients have been considered. Step 440 is a comparison of a first coefficient to the corresponding threshold (MaxRplRatio). Where this comparison 440 indicates the coefficient exceeds the threshold, the next step 450 results in an increment of the exceed counter (CoefsAboveMaxRplRatio). In any event, the coefficient counter (CoefsCount) is incremented at step 460, and the method returns to branch 430. Thus, while the echo canceller is running, the narrow band tone detector analyzes the adaptive coefficients by looking at the number of coefficients above the threshold (MaxRplRatio), which is based on the maximum coefficient level.

When all coefficients have been compared, i.e. the coefficient counter equals the number of coefficients, branch 430 is taken to branch 475, where the counter (CoefsAboveMaxRplRatio) of all coefficients above the threshold is compared to a predetermined ToneTriggered value. At the same time, the ERLE (Echo Return Loss Enhancement) is monitored to ensure that it is above a minimumERLE threshold. This condition is used to prevent false tone triggers, when the coefficients have diverged or just starting to converge, in which case the current ERLE will be smaller than the minimumERLE. If there are more coefficients above the MaxRplRatio than the predetermined ToneTriggered value, and the Echo Return Loss Enhancement is higher than the minimumERLE threshold, then the narrow band detector reports a tone detected to the echo canceller system (step 480), and further execution (step 490) is in accordance with the method 300.

Figure 5A:
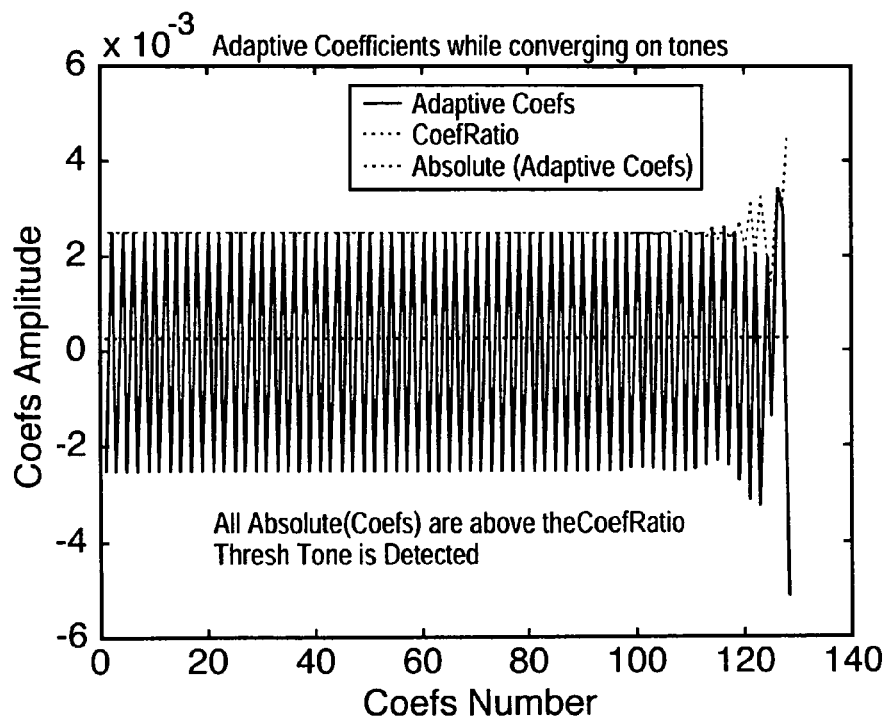
FIGS. 5A and 5B are graphical plots of coefficients amplitudes and thresholds.
Figure 5B:
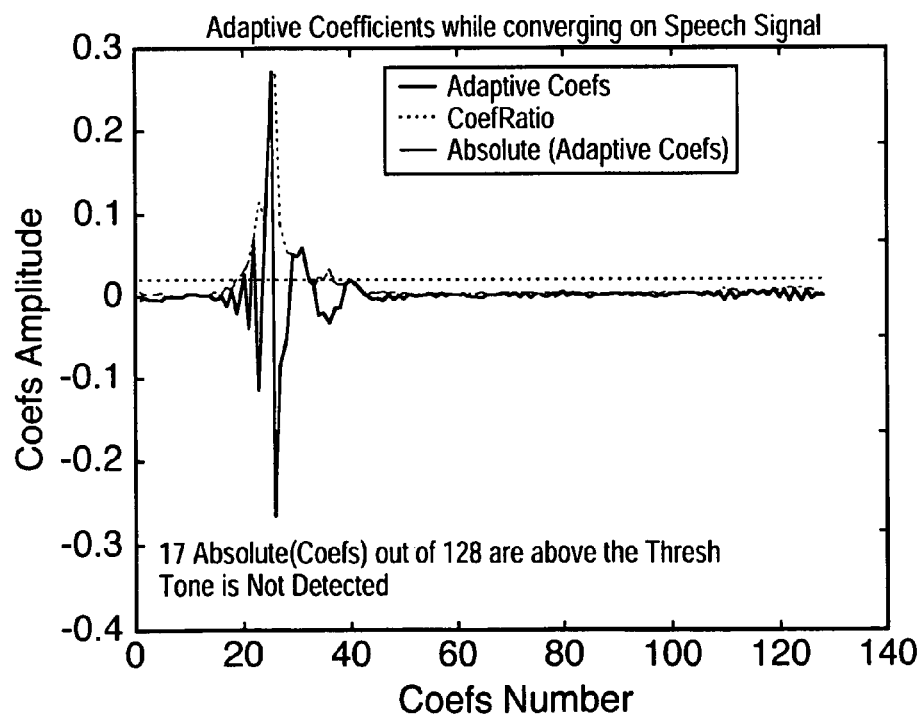

FIGS. 5A and 5B shows a graphical plot of implementation results of the present invention. This plot shows a typical number of coefficients, the corresponding amplitudes and thresholds.

It will be appreciated that, although embodiments of the invention have been described and illustrated in detail, various modifications and changes may be made. Different implementations may be made by those familiar with the art, without departing from the scope of the invention.

What is claimed is:

1. For use in an echo canceling system having an adaptive filter, the improvement comprising (i) detecting oscillation of coefficients of said adaptive filter, (ii) establishing a tone trigger threshold for each coefficient of said adaptive filter; and, in response, (iii) indicating to said echo canceling system that a tone is present, wherein each said tone trigger threshold is a function of a maximum value of said corresponding one of said coefficients of said adaptive filter.

2. The improvement of claim 1 wherein said detecting oscillation of coefficients is for discrete time (k) in a normalised least mean square (MNLS) algorithm adaptive filter echo canceling system and further comprises:
    (a) establishing a tone trigger count;
    (b) measuring echo return loss enhancement (ERLE);
    (c) comparing said adaptive filter coefficients to corresponding ones of said tone trigger thresholds, and accumulating a count value representing how many of said adaptive filter coefficients exceed corresponding ones of said tone trigger thresholds;
    (d) comparing said count value to said tone trigger count and comparing said ERLE to an ERLE threshold; and
    (e) in the event that said count value exceeds said tone trigger count and said ERLE is greater than said ERLE threshold, then indicating detection of said oscillation of said coefficients, and otherwise, indicating an absence of detection of oscillation of said coefficients.

3. A narrow band tone detector for use in an echo canceling system comprising an adaptive filter, comprising:
    detecting means configured to detect oscillation of coefficients of said adaptive filter;
    threshold setting means configured to establish a tone trigger threshold for each coefficient of said adaptive filter; and
    indicating means configured to respond to said detection by providing an indication that a tone is present, wherein each said tone trigger threshold is a function of a maximum value of said corresponding one of said coefficients of said adaptive filter.

4. The narrow band tone detector according to claim 3, wherein said detecting means comprises:
  threshold setting means configured to establish a tone trigger threshold for each coefficient of said adaptive filter,
  a counter arranged to count tone triggers;
  Echo Return Loss Enhancement (ERLE) measurement means;
  comparing means arranged to compare said adaptive filter coefficients to corresponding ones of said tone trigger thresholds and to accumulate a count value representing how many of said adaptive filter coefficients exceed corresponding ones of said tone trigger thresholds;
  count comparing means arranged to compare said count value to said tone trigger count and to compare said ERLE to an ERLE threshold; and
  output means configured to indicate detection of said oscillation of said coefficients in the event that said count value exceeds said tone trigger count and said ERLE is greater than said ERLE threshold and otherwise, to indicate an absence of detection of oscillation of said coefficients.

* * * * *